(12) United States Patent
Werre et al.

(10) Patent No.: US 10,053,292 B2
(45) Date of Patent: Aug. 21, 2018

(54) STEEP CONVEYING INSTALLATION FOR OPEN-CAST MINING

(71) Applicant: THYSSENKRUPP INDUSTRIAL SOLUTIONS AG, Essen (DE)

(72) Inventors: Klaus Werre, St. Ingbert (DE); Detlef Papagewski, Bochum (DE); Franz M. Wolpers, Kirkel (DE); Viktor Raaz, Bochum (DE)

(73) Assignee: THYSSENKRUPP INDUSTRIAL SOLUTIONS AG, Essen (DE)

( * ) Notice: Subject to any disclaimer, the term of this patent is extended or adjusted under 35 U.S.C. 154(b) by 0 days.

(21) Appl. No.: 14/376,045

(22) PCT Filed: Jan. 30, 2013

(86) PCT No.: PCT/EP2013/051795
§ 371 (c)(1),
(2) Date: Jul. 31, 2014

(87) PCT Pub. No.: WO2013/113753
PCT Pub. Date: Aug. 8, 2013

(65) Prior Publication Data
US 2014/0374220 A1    Dec. 25, 2014

(30) Foreign Application Priority Data
Jan. 31, 2012  (DE) .................. 10 2012 100 765

(51) Int. Cl.
*B65G 47/34* (2006.01)
*B65G 17/12* (2006.01)
(Continued)

(52) U.S. Cl.
CPC .......... *B65G 17/126* (2013.01); *B65G 37/00* (2013.01); *B65G 47/58* (2013.01); *B66B 15/08* (2013.01);
(Continued)

(58) Field of Classification Search
CPC ............................... B65G 37/00; B65G 17/48
(Continued)

(56) References Cited

U.S. PATENT DOCUMENTS

| 124,391 A | 3/1872 | Smith |
|---|---|---|
| 124,392 A | 3/1872 | Smith, Jr. |

(Continued)

FOREIGN PATENT DOCUMENTS

| CN | 103395614 A | * 11/2013 |
|---|---|---|
| DE | 150197 C | 4/1904 |

(Continued)

OTHER PUBLICATIONS

English language abstract for DE 19963464.
(Continued)

*Primary Examiner* — Gene O Crawford
*Assistant Examiner* — Lester Rushin, III
(74) *Attorney, Agent, or Firm* — thyssenkrupp North America, Inc.

(57) ABSTRACT

The instant invention relates to a steep conveying installation for arranging on a slope of an open-cast mining glory hole, by means of which raw materials can be transported from a lower height level, in particular from a mining floor of the open-cast mine, to an upper height level, in particular formed by a soil, encompassing a line arranged on the slope. According to the invention, provision is made for a first conveying basket and for a second conveying basket, which conveying baskets can be displaced on the line between the lower height level and the upper height level and are embodied to receive the raw materials, wherein the conveying baskets are in contact with one another via at least one common traction means.

20 Claims, 9 Drawing Sheets

(51) Int. Cl.
*B66B 15/08* (2006.01)
*E21C 41/26* (2006.01)
*E21F 13/04* (2006.01)
*B65G 37/00* (2006.01)
*B65G 47/58* (2006.01)
*E21C 47/00* (2006.01)

(52) U.S. Cl.
CPC .............. *E21C 41/26* (2013.01); *E21C 47/00* (2013.01); *E21F 13/04* (2013.01)

(58) Field of Classification Search
USPC .......... 198/701, 704, 711, 712, 713; 37/394, 37/398, 399, 400, 423, 462; 345/633; 414/595; 187/245
See application file for complete search history.

(56) References Cited

U.S. PATENT DOCUMENTS

| | | | |
|---|---|---|---|
| 266,301 A | 10/1882 | Morris | |
| 500,936 A * | 7/1893 | Northway | B65G 67/00 414/595 |
| 4,026,388 A | 5/1977 | Creissels | |
| 4,031,997 A | 6/1977 | Nelson | |
| 4,681,205 A | 7/1987 | Hoffmann et al. | |
| 4,693,661 A | 9/1987 | Trumper et al. | |
| 4,712,744 A * | 12/1987 | Kirchhoff | B02C 21/02 241/101.2 |
| 4,770,287 A * | 9/1988 | Glowatzki | B65G 17/126 198/706 |
| 6,457,576 B1 * | 10/2002 | Gunther | B65G 17/126 198/711 |
| 6,460,657 B1 | 10/2002 | Isenburg et al. | |
| 8,019,125 B2 * | 9/2011 | Nadreau | B07C 5/34 119/845 |
| 2008/0000757 A1 * | 1/2008 | Maguire | B60P 1/36 198/617 |

FOREIGN PATENT DOCUMENTS

| | | |
|---|---|---|
| DE | 474 242 C | 3/1929 |
| DE | 1054914 B | 4/1959 |
| DE | 2620741 A | 12/1976 |
| DE | 3303059 A1 | 8/1984 |
| DE | 3708698 A1 | 10/1988 |
| DE | 19963464 A1 | 8/2000 |
| WO | 2006/024097 A | 3/2006 |
| WO | 2009/003528 A1 | 1/2009 |
| WO | 2009/079801 A1 | 7/2009 |
| ZA | 200000210 B | 7/2000 |

OTHER PUBLICATIONS

English language machine translation of DE 1054914 B.
English language machine translation of DE 474242 C.
English language Abstract of DE 3708698 A1.
English machine translation of DE 150197 C.
Siemag Transplan—Inclined Hoisting Mining Equipment Brochure (Undated).
Archived Wikipedia Page for, "Funicular," as captured on Jan. 19, 2012 (printed on May 24, 2015) https://web.archive.org/web/20120119125233/http://en.wikipedia.org/wiki/Funicular.
Siemag Transplan, "Technical Drawings".
Skip Compagnie GmbH Essen Skip Conveying device in inclined shaft.
Kraynev A.F. Mechanics of machines. Fundamental Dictionary.—M .: Engineering, 2000; ISBN 5-217-0790-8.

* cited by examiner

STEEP CONVEYING INSTALLATION FOR OPEN-CAST MINING

CROSS REFERENCE TO RELATED APPLICATIONS

This application is a U.S. National Stage Entry of International Patent application Serial Number PCT/EP2013/051795, filed Jan. 30, 2013, which claims priority to German Patent Application Serial Number DE 102012100765.9, filed Jan. 31, 2012.

The instant invention relates to a steep conveying installation for arranging on a slope of an open-cast mining glory hole, by means of which raw materials can be transported from a lower height level, in particular from a mining floor of the open-cast mine, to an upper height level, in particular formed by a soil, encompassing a line arranged on the slope.

BACKGROUND

A steep conveying installation for arranging on the slope of an open-cast mining glory hole is known from DE 199 63 464 A1. Heavy goods vehicles, which are loaded with the raw materials, can be conveyed via the height distance between the mining floor of the open-cast mine and the upper height level, namely the soil, by means of the steep conveying installation. The steep conveying installation encompasses a travelling platform, on which heavy goods vehicles can travel and which can be pulled upwards across the height distance between the mining floor and the soil, via a traction means, which is formed from a plurality of ropes. An alternative for overcoming the height distance is thus created in that heavy goods vehicles travel on a correspondingly created road, which leads from the lower mining floor of the open-cast mine to the high soil. Heavy goods vehicles, which are used in mines or in other raw material open-cast mining, cause high costs and the speed across the created road for overcoming the height distance often needs to be chosen so as to be very slow. There is also a significant wear of the heavy goods vehicles, which results in further costs.

This height distance across the travelling platform can be overcome by means of the proposed conveying installation, which can be displaced at an incline. However, this results in the disadvantage that the drivers of the heavy goods vehicles for traveling on the mining floor and for traveling on the higher soil must alternate, because the drivers must leave the heavy goods vehicles, when the heavy goods vehicles are pulled up by means of the conveying installation.

A further disadvantage is created in that the heavy goods vehicles encompass a very high dead weight, which can be up to half of the payload. A conveying installation for conveying the payload and additionally for conveying the weight of the heavy goods vehicle must thus be dimensioned so as to be correspondingly large.

SUMMARY

It is thus the object of the invention to create a steep conveying installation for arranging on a slope of an open-cast mining glory hole, which overcomes the above-identified disadvantages of the state of the art and which causes the smallest possible structural effort in response to a high conveying capacity. In particular, it is the object is to create a steep conveying installation comprising a high flexibility, which does not necessarily require a heavy goods vehicle for conveying for the operation.

This object is solved based on a steep conveying installation for the open-cast mining according to the preamble of claim 1 as well as a system according to claim 18 comprising the respective characterizing features. Advantageous further developments of the invention are specified in the dependent claims.

BRIEF DESCRIPTION OF THE DRAWINGS

The present disclosure is described in detail below with reference to the attached drawing figures, wherein.

DETAILED DESCRIPTION

Figure 1:
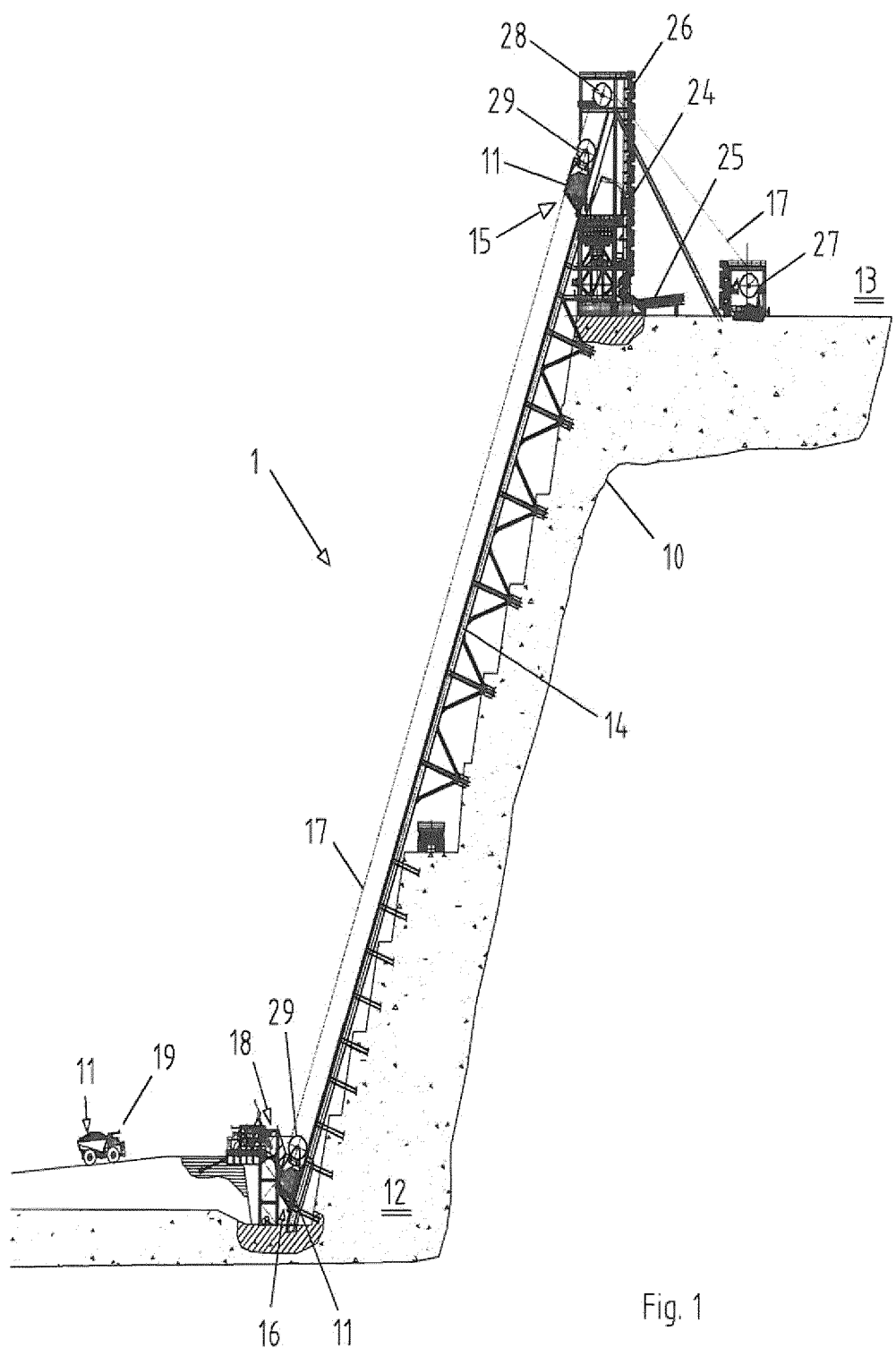
FIG. 1 is a side view of an embodiment of a steep conveying installation of the present disclosure.

The invention includes the technical teaching that provision is made for a first conveying basket and a second conveying basket, which conveying baskets can be displaced on the line between the lower height level and the upper height level and which are designed to receive the raw materials, wherein the conveying baskets are connected to one another via at least one common traction means.

The capacity for conveying the raw materials from the lower height level to the upper height level is increased significantly by means of the design of the steep conveying device according to the invention. In particular, the advantage is attained that the mass of the heavy goods vehicles does not need to be conveyed across the height difference between the lower and the upper height level by means of the steep conveying installation. The increase of the conveying capacity, however, is created in particular in that two conveying baskets, which form a counterweight to one another, are used and can be displaced on the line, so that the mass of the conveying baskets is cancelled out. It is attained through this that the steep conveying installation must only be designed for the mass of the raw materials, which must be conveyed maximally, because the mass of the conveying baskets is negligible. However, an energetic advance is created, in particular because curb masses, which do not form the payload, do not need to be conveyed across the height between the lower and the upper height level.

Due to the possible reciprocating operation of the conveying baskets, however, the further advantage of an increased conveying speed is created, because one conveying basket can be loaded at the lower height level, while one conveying basket can be unloaded at the upper height level. The loading and unloading time of the first and second conveying basket can thus overlap in each case, so that the effect of two conveying baskets, which are used in parallel, can be utilized in an advantageous manner.

In a particularly advantageous manner, the conveying baskets can be dimensioned such that one conveying basket can receive the raw material load of a heavy goods vehicle, so that a heavy goods vehicle, which is loaded with a load of raw materials, can transfer these raw materials into a conveying basket for completely filling the latter.

Advantageously, provision can be made in the area of the lower height level of the line for a filling device for filling the conveying baskets, in particular, the raw materials can be transferred from vehicles, for example from large heavy goods vehicles, into the conveying baskets by means of the filling device. The filling device can encompass a filling funnel, for example, through which the raw materials can be guided from the vehicle into a filling opening of the conveying baskets. Preferably, the vehicle can encompass a tiltable loading device, so that the raw materials are poured into the filling opening of the conveying baskets through the filling funnel by tilting the loading device. The filling device can be located in the area of the mining floor and provision can be made for a ramp, in particular as part of the filing device, on which vehicles can be moved to a level slightly above the conveying baskets. If a conveying basket is located in the lower position of the line, the raw materials can be transferred into the conveying basket by emptying the vehicle slightly above the filling opening of said conveying basket.

Due to the fact that the steep conveying installation according to the invention encompasses a first conveying basket and a second conveying basket, which can alternately assume the lower position on the line so as to alternate on a first side and on a second side of the line, the filling funnel can encompass two openings, which are arranged next to one another and the first opening provides for a filling of the first conveying basket on a first side of the line and the second opening provides for a filling of the second conveying basket on the second side of the line. The filling device can form a structural unit with the line in a particularly advantageous manner.

According to a further particularly advantageous embodiment of the conveying baskets, the latter can encompass emptying openings located below the filling opening, through which the raw materials can be emptied from the conveying baskets by maintaining the position of the conveying baskets. In particular, the emptying of the conveying baskets can take place by maintaining the position relative to the line. The conveying baskets can encompass guide rollers, which are guided on guide rails of the line. More specifically, the material transportation line may include at least one guide rail coupled thereto or defined thereon, or alternatively the material transportation line may itself be one or more guide rails. The conveying baskets may also have one or more guide rollers disposed thereon, wherein the guide rollers of the conveying baskets ride on, and/or are guided on/by, the guide rails. The conveying baskets can be emptied while being arranged on the line through the emptying opening, which is arranged below the filling opening. For emptying the conveying baskets, the emptying openings in each case encompass emptying flaps, which are locked via a corresponding bolt lock, and the bolt lock can be unlocked for emptying the conveying baskets and the emptying flap can be opened.

The line can extend beyond the upper height level in a further advantageous manner, so that, due to the force of gravity, the raw materials can be transferred from the conveying baskets into at least one device, which serves in particular for further processing and/or further transporting the raw materials and which is substantially arranged or set up, respectively, on the soil. The force of gravity is thus used to fill the conveying baskets in their lower position on the line and the force of gravity is also used to empty the conveying baskets again in their upper position on the line, preferably above the soil. In particular, the conveying baskets perform a linear movement between their lower and their upper position, without the need to guide the conveying baskets in their movement and in their position out of the linear movement at the line.

According to a further advantageous embodiment of the steep conveying installation according to the invention, the device, which further processes the raw material, can be embodied as communition device, in particular as breaker or as transport device, in particular as conveyor belt. The raw materials can thus initially be transferred, in particular poured, from the conveying baskets into the comminution device, for example, to which the transport device connects, so that the raw materials can be transported further, in particular to a collecting point or for example to further vehicles, which travel on the upper height level.

A significant advantage of coupling the steep conveying installation to a processing device, in particular a breaker, is that the processing device can be designed such that exactly one raw material load can always be put from the conveying basket into the processing device. For example, the breaker can encompass an upstream raw material storage, into which the raw material is poured initially from the conveying basket and the breaker can operate continuously during a conveying cycle, in which the conveying baskets are conveyed across the line, until the next conveying basket is emptied again into the raw material storage, so that a raw material quantity is always present in the raw material storage. In response to a discontinuous conveying across the line, a continuous discharge of the comminuted material is thus possible and an intermediate storage, such as a bunker or the like, is not necessary.

A further advantage of combining the steep conveying installation with a processing device follows from the fact that a separate foundation is not required for fastening the installation on the upper height level because the weight of the processing device, in particular of a breaker, can already be used for forming the foundation, and the arrangement of the drive unit on a rear side of the crusher only serves to stabilize the overall system in connection with the massive breaker for forming the foundation or for replacing the foundation, respectively.

The traction means can be connected to a drive unit, which is preferably arranged at a distance to the upper end of the line on the soil and wherein the traction means is guided via drive wheels of the drive unit. Upper deflection rollers can be fixedly arranged on the upper end of the line and lower deflection rollers can be arranged on the conveying baskets so as to be movable with the conveying baskets, and the traction means can in each case form at least one winding device according to the type of a pulley between the upper and the lower deflection rollers. For example, a first pulley can be assigned to the first conveying basket and a second pulley can be assigned to the second conveying basket. Both pulleys can be formed from a continuous traction means, which passes through the drive unit.

The winding devices can form a double-acting pulley for halving the tractive force, preferably a fourfold-acting pulley for dividing the tractive force into four and particularly preferably an eightfold-acting pulley for dividing the tractive force into eight in the traction means. The tractive force thereby corresponds to the force, which the drive unit must introduce into the traction means. The traction means can preferably be formed from one or a plurality of steel ropes, which are in particular guided in parallel.

The traction means encompasses a first and a second traction means end and the entire steep conveying installation can be operated with a single continuous traction means. The two traction means ends can preferably in each case be arranged on a length compensation means and the traction means ends can be retractable, in particular independent from one another, by means of the length compensation means, or a further traction means length can in each case be released.

By retracting or releasing a traction means length, the height position of the respective conveying basket, which is assigned to the side of the respective traction means end, can be adjusted. For example, the position of the conveying basket on the inclined line can be a function of the loading thereof, because the traction means can encompass an elastic elongation as a function of the loading of the conveying baskets. If an upper height position, for example, for emptying the raw material must be approached with the conveying basket, and if the further conveying basket, for example, is located at a stop in the lower height position, the height position of the upper conveying basket can be adjusted by correspondingly retracting or releasing a traction means length. The actual conveying height can thus be overcome by means of the drive unit, and the fine adjusting of the height position of the conveying basket in particular in the upper height position is carried out by means of the length compensation means. The latter can comprise a hydraulic unit or a carriage, for example, which is guided on corresponding rails and the length compensation means can retract or release the traction means on the conveying basket side, on which the conveying basket is in the upper position, while the lower conveying basket rests on a stop, for example.

The length compensation means can furthermore serve to steadily release a further in particular larger traction means length, if the line is to be extended deeper due to progressing mining in the opencast mine. For example, the line can be embodied such that the lower height level, in particular on the mining floor of the open-cast mine, can gradually be placed deeper. The length of the traction means must thus also be increased and the length compensation means can be embodied for steadily releasing an additional traction means length. For example, the length compensation means can encompass a rope drum, which is guided on rails. For briefly adjusting a nominal height of the conveying baskets, the position of the rope drum can be changed accordingly across the rail length, so that only short rope lengths are released or retracted. If the traction means is to be extended steadily, for example if the mining floor is placed deeper, the rope drum can be unwound while maintaining the position of the rope drum on the rail, wherein the short-term height adjustment of the conveying basket can overlap the unwinding of the traction means from the rope drum by retracting or releasing a further traction means length by means of dynamically displacing the rope drum on the rail for each conveying cycle.

The drive unit can encompass two drive wheels, for example, around which the traction means is wound, preferably with a total wrap angle of at least 360° and preferably of at least 540°. Due to the large total wrap angle, it is ensured that the traction means does not slip through on the drive wheels and that the frictional forces are large enough so as to transfer the drive torque of the drive wheels to the traction means. Two drive wheels, which are driven in parallel and to which a motor transmission unit is assigned in each case, are suitable for this purpose, wherein a first motor transmission unit interacts with the first drive wheel and a second motor transmission unit interacts with the second drive wheel in a driving manner. The traction means can be wound around the first drive wheel by 90° and can be guided to the second drive wheel. The traction means wraps around the second drive wheel, which rotates in the same plane as the first drive wheel, at an angle of 180° and is guided back to the first drive wheel. The traction means also wraps around said first drive wheel at an angle of 180°, and the traction means is guided back to the second drive wheel and wraps around the latter again by 90°. 3×180° wraps thus result, which preferably leads to a total wrap angle of 540°. The motor transmission units can be driven synchronously to one another via a corresponding control, so that the drive torques applied to the drive wheels preferably encompass the same values.

A further particular advantage is attained in that the respective winding device, thus the pulley, is formed with a first traction means and with at least a further traction means. Together, the traction means can thus form the first pulley for lifting and lowering the first conveying basket and, together, they can form the second pulley for lifting, and lowering the second conveying basket, wherein at least two traction means in each case also wrap around the drive wheels of the drive unit. The two traction means can preferably be guided in parallel across their entire length. It goes without saying that more than two traction means can also be guided in parallel, and three or more traction means can also form the pulleys in parallel arrangement.

Due to the increase of the number of the individual traction means, the latter can be embodied with smaller dimensions, so that the entire dimensioning of the steep conveying installation does not increase, preferably even decreases. In particular, the diameters of the drive wheels, but also the diameters of the deflection rollers, can be chosen so as to be smaller, whereby the entire dimensioning of the steep conveying installation decreases. If, for example, two traction means in the form of ropes are guided in parallel, the tractive force in the respective traction means is halved. If three or more ropes are used in parallel, the force in the individual rope is divided by the number of the ropes guided in parallel. It is thereby particularly advantageous that the pulleys comprising traction means, which are guided in parallel, are also formed with a corresponding number of pulley redirections, whereby the tractive force resulting in the traction means is also reduced.

If provision is made, for example, across the entire traction means length, for two traction means, which are guided in parallel, the drive wheels can encompass at least one drive wheel, around which a first traction means wraps, and at least one drive wheel, around which a second traction means wraps, and the drive wheels can preferably be arranged so as to rotate about a common axle. The drive wheels, which are accommodated on the common axle and around which the two traction means wrap, can thereby also be embodied in one piece.

A first drive wheel and a second drive wheel can also be provided and a first traction means can wrap around them, and provision can be made for a first drive wheel and for a second drive wheel, around which the second traction means wraps. In the case of two traction means, which are guided in parallel, provision can thus be made, for example, for a total of four drive wheels, which are in each case driven in pairs on two axes, which are arranged parallel to one another. The instant invention is furthermore directed to a conveying cascade comprising at least two steep conveying installations, wherein the lower height lever of an upper steep conveying installation follows the upper height level of a lower steep conveying installation, and wherein provision is made in particular between the steep conveying installations for means for transferring the raw materials from the lower steep conveying installation to the upper steep conveying installation. The conveying cascade can also be formed from more than two individual steep conveying installations, for example, and, independent from a limited maximum conveying height of an individual steep conveying installation, a conveying cascade can overcome an arbitrary conveying height. The means for transferring the raw materials between the steep conveying installations can comprise corresponding decanting funnels, for example, and a conveying basket, which is located in the upper position of a lower steep conveying installation, can transfer the raw materials through its emptying opening into the filling opening of a conveying basket, which is located in the lower position of an upper steep conveying installation, by means of the decanting funnel. In spite of a technically limited maximum conveying height of an individual steep conveying installation comprising a conveying cascade according to the instant invention, the raw materials can thus be conveyed across unlimited heights.

The instant invention is further directed to a system comprising a steep conveying installation, by means of which raw materials can be transported from a lower conveying level, in particular from a mining floor of an open-cast mine, to an upper height level, in particular formed by a soil, and provision is made for a comminution device for comminuting the raw materials, wherein the system encompasses at least one line and a first conveying basket and a second conveying basket, said conveying baskets can be displaced on the line between the lower height level and the upper height level and are embodied for receiving the raw materials, wherein the conveying baskets are in contact with one another via at least one common traction means and wherein the comminution device is arranged on the lower or on the upper height level of the steep conveying installation and forms in particular a structural unit therewith. For example, the comminution device can be embodied as breaker. A device for further transporting the raw material can further be a part of the system according to the invention. The transport device can in particular follow the comminution device, which is arranged on the upper height level. The above-described features and advantages of a steep conveying installation can also be considered for a system comprising such a steep conveying installation.

FIG. 1 shows an exemplary embodiment of a steep conveying installation 1 comprising the features of the instant invention. The steep conveying installation 1 is arranged on a slope 10 of an open-cast mining glory hole, and the slope 10 extends from a lower height level 12 to an upper height level 13. The lower height level 12 is formed by the mining floor 12 of the open-cast mine, and the upper height level 13 is formed by the soil 13, and the soil 13 thus forms the height level, on which the raw material 11 can be further transported, in an exemplary manner.

The steep conveying installation 1 encompasses a line 14, which extends from the lower height level 12 beyond the upper height level 13. The material transportation line 14 may include at least one guide rail coupled thereto or defined thereon, or alternatively the material transportation line 14 may itself be one or more guide rails. The line 14 is fastened to the inclined slope 10, and a supporting structure 26, to which the line 14 is fastened so as to run continuously, serves to extend the line 14 beyond the upper height level 13.

In the mining floor 12, the steep conveying installation 1 encompasses a filling device 18, and a vehicle 19 loaded with raw material 11 is shown, which can transfer the raw material 11 to the steep conveying installation 1 by means of the filling device 18. A device 24 which forms a comminution device 24, for example in the form of a breaker, is shown in the area of the upper height level 13 as structural unit comprising the supporting structure 26. A device 25, which forms a transport device 25 and which serves to further transport the raw material 11, is furthermore shown.

According to the invention, the steep conveying installation 1 encompasses a first conveying basket 15 and a second conveying basket 16, and the conveying baskets 15 and 16 can be displaced on the line 14 between the lower height level 12 and the upper height level 13. The two conveying baskets 15 and 16 are coupled to one another via a common traction means 17, and the traction means 17 is embodied as a steel rope in an exemplary manner.

A drive unit 27, which is arranged at a distance to the supporting structure 26 on the soil 13 and which is anchored therein, serves to drive the conveying baskets 15 and 16 via the common traction means 17. The traction means 17 thereby passes through the drive unit 27, and while the second conveying basket 16 is pulled up in the direction of the upper height level 13, for example, the first conveying basket 15 is moved down in the direction of the lower height level 12. For this purpose, the drive unit 27 is operated in a first functional direction, and so as to convey the first conveying basket 15 back in the direction of the upper height level 13, while the second conveying basket 16 is moved down again in the direction of the lower height level 12, the drive unit 27 is operated in a second opposite functional direction. A reciprocating operation of the conveying baskets 15 and 16 is thus created and the dead weight of the first conveying basket 15 can compensate the dead weight of the second conveying basket 16, so that the drive unit 27 does not need to move the masses of the conveying baskets 15 and 16 against the force of gravity, because the masses compensate one another via the traction means 17.

The traction means 17 forms a pulley for the respective conveying basket 15 and 16 between upper deflection rollers 28 which are arranged on the supporting structure 26, and lower deflection rollers 29, which are arranged on the respective conveying baskets 15 and 16 and which are thus movable. The required tractive force, which must be introduced into the traction means 17 by the drive unit 27, thus becomes smaller than the mass of the raw material 11 in the respective conveying baskets 15 and 16.

Figure 2:
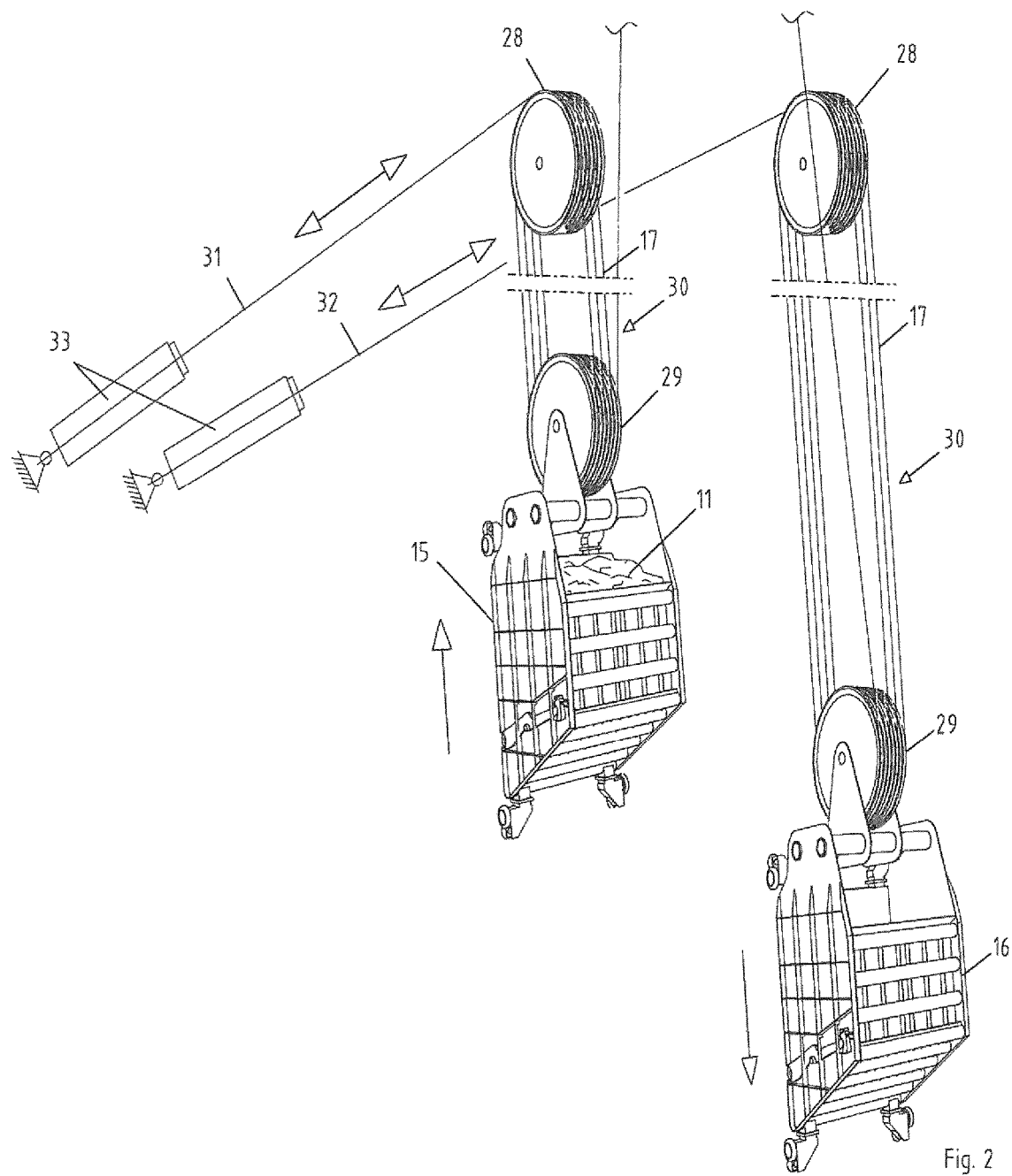
FIG. 2 is a partial isometric view of an embodiment of two conveying baskets moveable by an associated pulley system that is formed by a traction means wrapped around corresponding upper and lower deflection rollers, according to the present disclosure.

FIG. 2 shows the arrangement of the winding devices 30 of the traction means 17 between the upper deflection rollers 28 and the lower deflection rollers 29 in a schematic manner, and the winding devices 30 are embodied as 8-fold pulleys 30. The upper as well as the lower deflection rollers 28 and 29 in each case encompass four rope pulleys, and the tractive force, which the drive unit 27—which is not shown herein—is to introduce into the traction means 17, is only one eighth of the weight of the conveying baskets 15 and 16 and the raw material 11, so as to convey said conveying baskets with the raw material 11 above the incline in the shown direction of the arrow.

The traction means 17, which is designed in one piece and thus so as to be continuous, encompasses two traction means ends 31 and 32, which according to the example, are in each case arranged on a length compensation means 33. The length compensation means 33 provide for a retraction or a release of a further traction means length, so that the height position of the first conveying basket 15 as well as of the second conveying basket 16 can be adjusted by means of the length compensation means 33. For example, the second conveying basket 16 can be located at a stop on the lower height level 12, wherein the stop is a part of the filing device 18, for example, and a variable elastic elongation in the traction means 17 can result due to a loading of the first conveying basket 15, which differs from conveying cycle to conveying cycle and which can have a different weight. To unload the first conveying basket 15 comprising the raw material 11 in the area of the upper height level 13, it might be necessary, however, to approach an accurate height position. The traction means ends 31, for example, can thus be retracted or released by the length compensation means 33 so as to approach the required position on the line 14 with the first conveying basket 15 and so as to subsequently unload the raw material 11. If the second conveying basket 16 is located on the upper height level 13, for example, and must approach a required position, the traction means end 32 can be retracted or released in the same manner by means of the assigned length compensation means 33.

Figure 3:
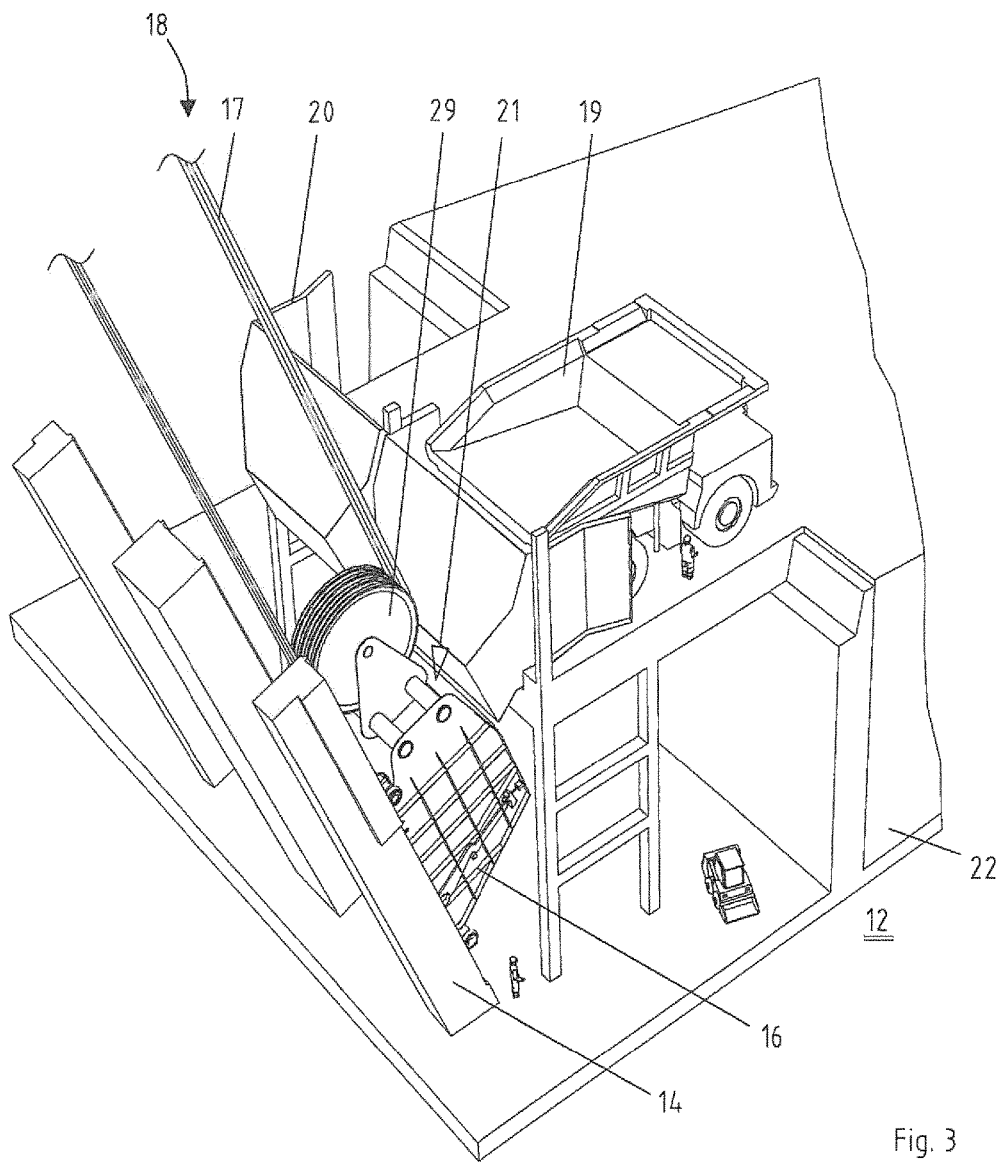
FIG. 3 is a schematic perspective view of an embodiment of a lower height position comprising a filling device for filling the conveying baskets with raw material from material hauling vehicles, as disclosed herein.

The filling device 18 is illustrated in a perspective manner in FIG. 3, and the line 14 of the steep conveying installation 1 is shown in the area of the lower height level 12. A ramp 22, which, as shown, is formed by banking of soil, is arranged on the lower height level 12. A shown vehicle 19 can be driven to a height, which is located above the second conveying basket 16 shown in the lower position according to the example, via the ramp 22. The second conveying basket 16, which can rest on a lower stop of the line 14, encompasses a filling opening 21 in its upper area. If the raw material is to be conveyed from the vehicle 19 into the second conveying basket 16 through the filling opening 21, the vehicle 19 unloads the raw material through a filling funnel 20, so that it is ensured that the raw material reaches through the filling opening 21 into the conveying basket 16. The conveying basket 16 can subsequently be pulled upwards via the line 14 by means of the traction means 17, which is shown as being wrapped around the lower deflection roller 29 at the conveying basket 16.

The filling funnel 20 is designed such that a further conveying basket, which is displaced on the rear side of the line 14, can be moved underneath a rear area of the filling funnel 20, which is located adjacent to the shown vehicle 19. A further vehicle 19 in adjacent arrangement to the shown vehicle 19 can then fill further raw material through the filling funnel 20 into the conveying basket 15—which is not shown—, which can be located on the rear side of the line 14. The conveying baskets 15 and 16 can thus be moved underneath the filling funnel 20 alternately on a first and on a second side in reciprocating operation and can also be loaded alternately with raw material 11 from vehicles 19. Said vehicles 19 transfer the raw material 11 into the conveying baskets 15 and 16 alternately on the front and on the rear side of the filling funnel 20.

Figure 4:
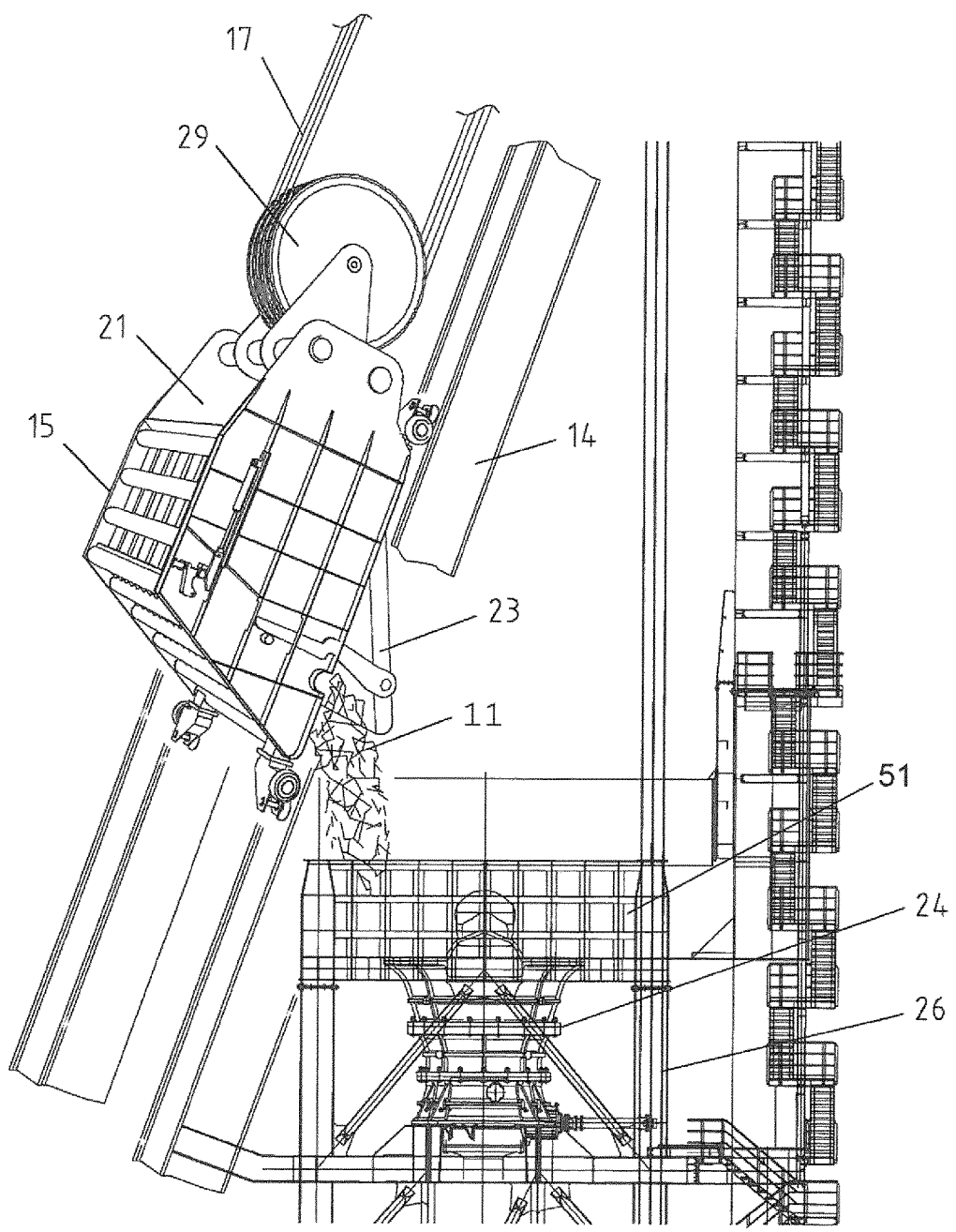
FIG. 4 is a combined partial side and isometric view of an embodiment of an upper height position of a line of the present disclosure, depicting a conveying basket disposed thereon and transferring materials into a material handling device.

FIG. 4 illustrates the upper area of the line 14, which is arranged on the supporting structure 26. According to the example, the first conveying basket 15 is shown in the upper unloading position and the raw material 11 can reach through an emptying opening 23 from the conveying basket 15 into a comminuting device 24, which comprises a raw material storage 51 into which the raw material 11 is supplied initially. The comminution device 24, which is fed continuously from the raw material storage 51, follows the raw material storage 51. The emptying opening 23 of the conveying basket 15 is located in a lower area, whereas the filling opening 21 is arranged in an upper area of the conveying basket 15. The conveying basket 15 is held by means of the traction means 17, which is looped through the lower deflection roller 29, and the deflection roller 29 is arranged on the conveying basket 15.

The structural design of the supporting structure 26 shows a structural unit between the steep conveying installation 1 with the line 14 and the comminution device 24. The conveying basket 15 can be conveyed to a height, from which the raw material 11 can be poured easily into the comminution device 24 or into the raw material storage 51 respectively, without changing the position or the arrangement of the conveying basket 15 at or on the line 14. The conveying basket 15 does in particular not need to be tilted so as to empty the raw material 11 from the conveying basket 15, for example through the filling opening 21.

Figure 5:
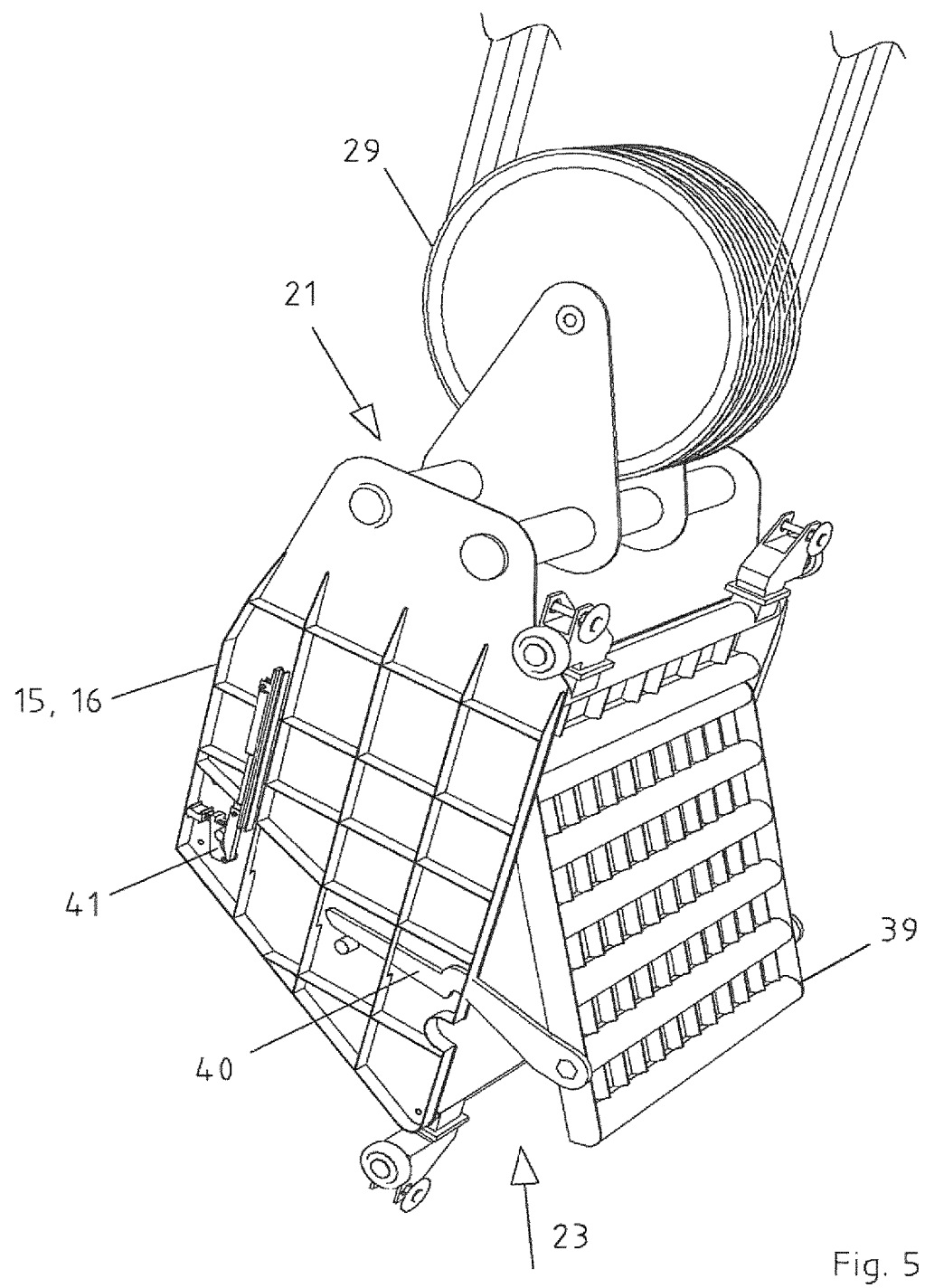
FIG. 5 is a perspective view of an embodiment of a conveying basket of the present disclosure.

FIG. 5 shows a perspective view of a conveying basket 15 or 16, respectively, which is formed from a steel structure, for example, and at which a lower deflection roller 29 is shown to be arranged, and the latter consists of four rope pulleys for forming the pulley 30, see FIG. 2 with regard to this. The filling opening 21 is formed by an upper, open area of the conveying basket 15 or 16, respectively, below the lower deflection roller 29, and the emptying opening 23 is embodied with an emptying flap 39, which is shown in an open position. The emptying flap 39 forms a lower wall of the conveying basket 15 or 16, respectively, and can be closed or opened—as shown—by means of a locking device.

The locking device, which is provided on both sides of the emptying flap 39 and which is illustrated on the front side, comprises a flap bolt 40, which can be closed by means of a bolt lock 41 in a closed position or can be unlocked, as shown, so as to open the emptying flap 39. The mode of operation of the locking device is illustrated in more detail in FIGS. 6 and 7 below.

Figure 6:
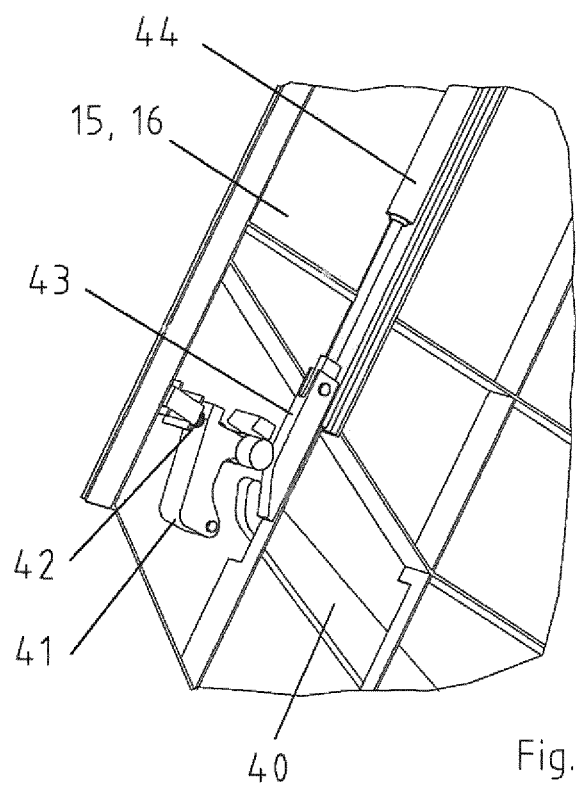
FIG. 6 is an isometric detail view of an embodiment of a locking device for an emptying opening closure flap of a conveying basket as disclosed herein, the locking device being depicted in a locked state.
Figure 7:
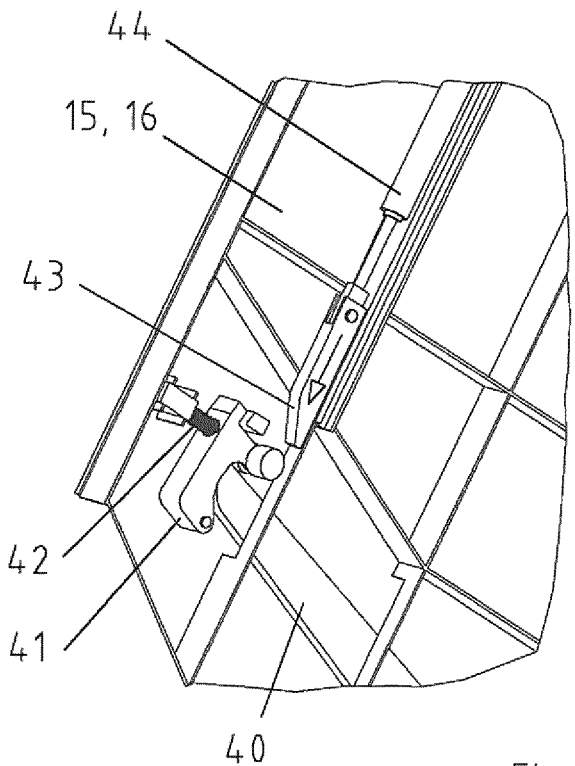
FIG. 7 is an isometric detail view of an embodiment of the locking device of FIG. 6, the locking device being depicted in an unlocked state.

FIGS. 6 and 7 show the locking device, which serves to lock and to release the emptying flap 39 (see FIG. 5), wherein the locking device is shown in a closed position in FIG. 6 and in an open position in FIG. 7.

In FIG. 6, the flap bolt 40 which is arranged on the emptying flap 39 in an articulated manner, which is not shown in detail, is engaged with a bolt lock 41, which is locked by means of a locking means 42 in the shown position. The conveying basket 15 or 16, respectively, is already located in the desired emptying position, and provision is made for an activation member 43, which can be moved against the bolt lock 41 by means of a lifting means 44, for example by means of a lifting cylinder.

FIG. 7 shows the activation member 43, which was moved against the bolt lock 41 by means of the lifting means 44 in the direction of the arrow, without the need to move the conveying basket 15 or 16, respectively, in its height position on the line 14 for this purpose. In that the activation member 43 engages with the bolt lock 41, the bolt lock 41 is disengaged from the flap bolt 40 contrary to the effect of the locking means 42, so that said flap bolt can move into the illustrated unlocked position. The emptying flap 39 can thus be opened for emptying the raw material 11 from the conveying basket 15 or 16, respectively.

By arranging the activation member 43, which can be moved against the bolt lock 41 by means of the lifting means 44 in a liftable manner, the advantage is attained that the conveying basket 15 or 16, respectively, does not need to be moved into an accurate height position on the line 14 for opening the emptying flap 39. The opening of the emptying flap 39 "down to the last meter" is carried out by activating the activation member 43 and the activation can be triggered, for example, when the conveying basket 15 has reached a minimum height, so that the raw material 11 can reach the subsequent device 24. In particular, provision can be made for an upper stop of the conveying basket 15 or 16, respectively, because a further upwards movement can be avoided by means of the stop after emptying the conveying basket 15 or 16, respectively, and due to the mass loss of the conveying basket 15 or 16, respectively, associated therewith.

Figure 8:
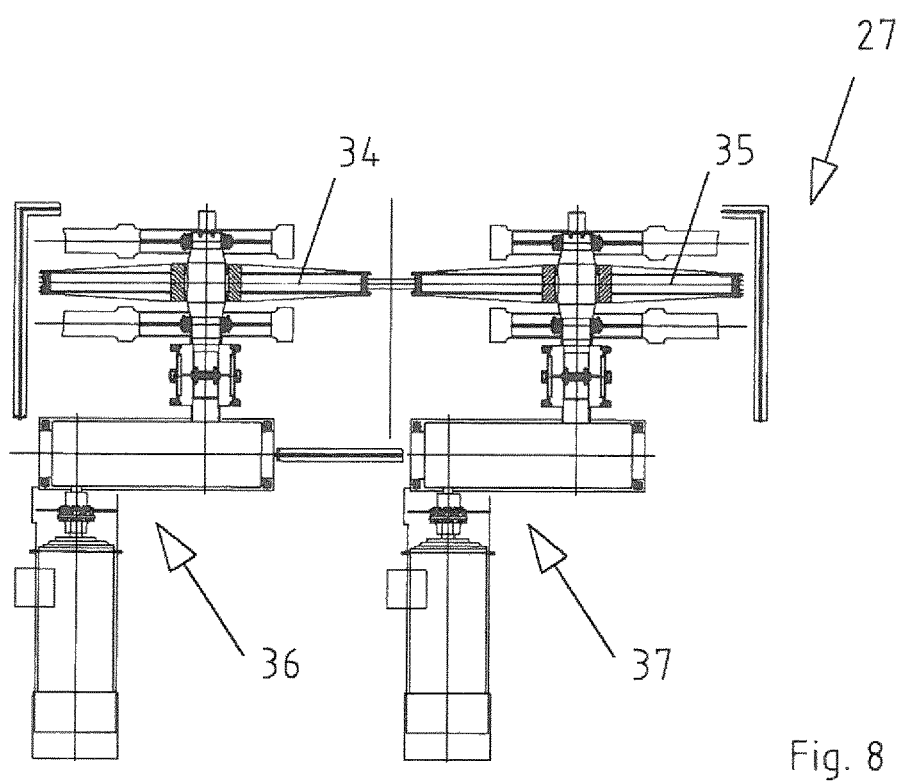
FIG. 8 is a top schematic view of an embodiment of a drive unit for driving the conveying baskets of the present disclosure.

FIG. 8 shows a schematic design of the drive unit 27 with a first driven drive wheel 34 and a second driven drive wheel 35, and the traction means 17 wrap around the drive wheels 34 and 35 in a manner, which is not shown in detail. The drive wheel 34 is driven by means of a motor transmission unit 36 and the drive wheel 35 is driven by means of a motor transmission unit 37. The motor transmission units 36 and 37, which can be operated independent from one another, are operated via a common control, so that the drive torques of the drive wheels 34 and 35 are substantially the same, wherein the drive wheels 34 and 35 run synchronous to one another. The wrapping of the traction means 17 around the drive wheels 34 and 35 is illustrated in more detail in FIG. 9.

Figure 9:
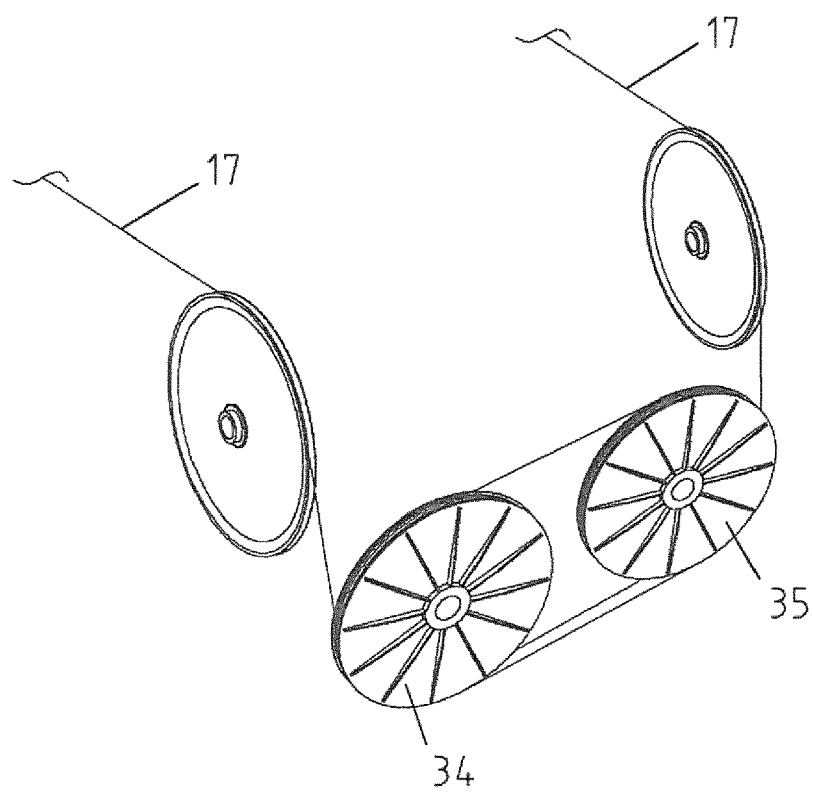
FIG. 9 is a partial isometric view of an embodiment of the drive wheels of a drive unit in an operative connection with a traction means, according to the present disclosure.

FIG. 9 shows a schematic illustration of the drive wheels 34 and 35, around which the traction means 17 wraps several times. The traction means 17 wraps around each of the drive wheels 34 and 35 with a wrap angle of 270°, so that a sufficient frictional connection is at hand for the torque transfer from the drive wheel 34 or 35, respectively, to the traction means 17. The traction means 17 is only embodied as a simple steel rope and is wrapped around the drive wheels 34 and 35, and further possibilities for creating an arrangement comprising traction means 17, which further reduces the mechanical load of the individual traction means 17, are shown in FIGS. 10 and 11 below, whereby the traction means 17 can be chosen so as to have smaller dimensions and so as to nonetheless transport correspondingly large raw material quantities 11 across the conveying height.

Figure 10:
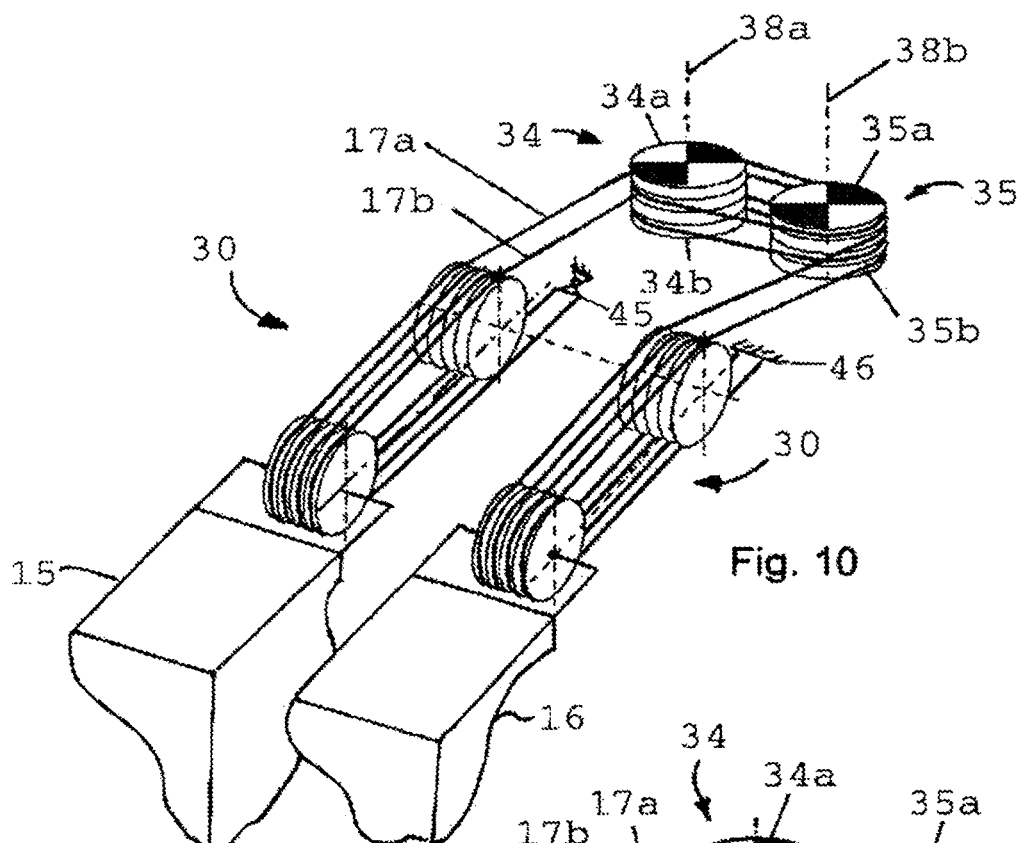
FIG. 10 is a partial isometric schematic view of an embodiment of the winding devices of the present disclosure, which are embodied as pulley systems having two traction means guided in parallel over deflector rollers and drive wheels.
Figure 11:
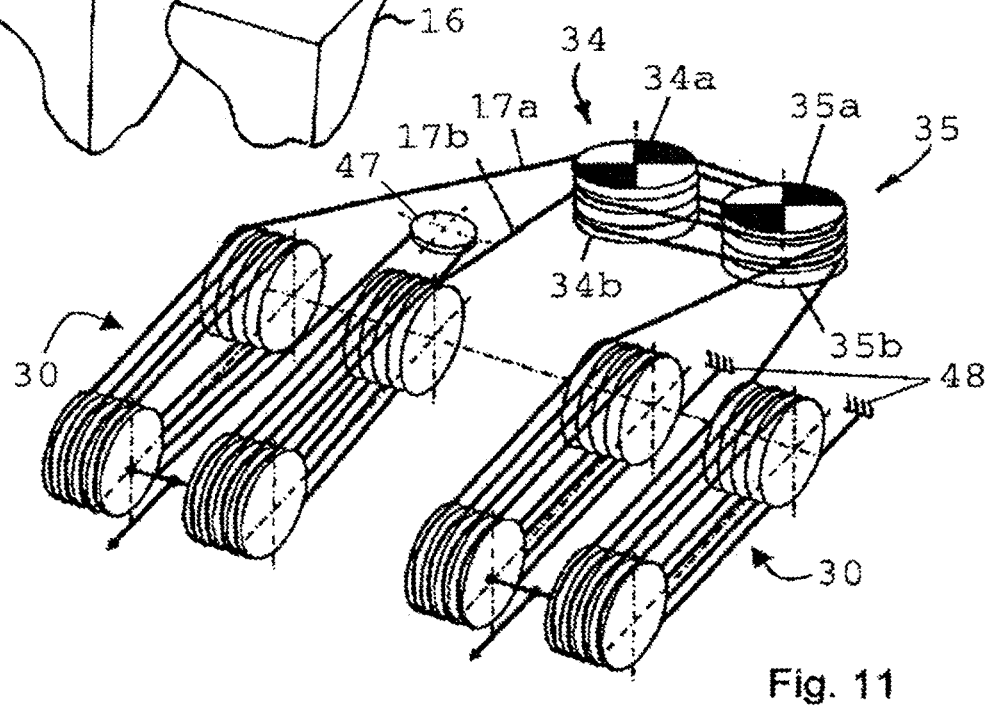
FIG. 11 is a partial isometric schematic view of an alternate embodiment of the winding devices of the present disclosure, which are embodied as pulley systems having two traction means guided in parallel over deflector rollers and drive wheels.

FIG. 10 shows an arrangement of the pulleys 30 comprising a first traction means 17a and a second traction means 17b for lifting and lowering the conveying baskets 15 and 16. The conveying baskets 15 and 16 are thereby in each case arranged on the traction means 17a and 17b so as to be movable in height, and the traction means 17a and 17b are wrapped around the drive wheels 34 and 35 equally.

The traction means 17a and 17b are guided substantially parallel across their entire lengths and the parallel arrangement of the traction means 17a and 17b together forms the pulleys 30. As a result, the mechanical load of the individual traction means 17a and 17b is halved and the latter can be dimensioned in a correspondingly smaller manner.

The drive wheels 34 and 35 are in each case embodied in a multi-track manner and the drive wheel 34 is divided into a drive wheel 34a and a further drive wheel 34b, which rotate together about a first drive axle 38a and which are also driven together. In particular, the drive wheels 34a and 34b can be embodied in one piece and can together form the drive wheel 34, wherein both traction means 17a and 17b are wound around the drive wheel 34. The drive wheel 35 can likewise comprise a drive wheel 35a and a drive wheel 35b, and the traction means 17a wraps around the drive wheel 35a and the traction means 17b wraps around the drive wheel 35b. The drive wheels 35a and 35b can also be embodied in one piece and can be driven together about the drive axle 38b.

The shown pulleys 30 for conveying the conveying baskets 15a and 15b are in each case embodied as pulleys acting in a four-fold manner, comprising double-guided traction means 17a and 17b. The ends of the traction means 17a and 17b are arranged on a first side on a length compensation means 45, which is embodied in the type of a rocker. The traction means 17a and 17b can thus compensate respective lengths to one another in that the rocker-like length compensation means 45 can tilt accordingly at its mounting. According to the example, the opposite ends of the traction means 17a and 17b are fixedly arranged on a load suspension means 46.

The length compensation means 45 as well as the load suspension means 46 can be displaced in the direction of travel of the traction means 17a and 17b in a manner, which is not shown in detail. A compensation of the height position of the conveying baskets 15 and 16 can thus take place in the manner, which has already been described above, and the mobile arrangement of the length compensation means 45 and/or of the load suspension means 46 attains the same effect as the above-described length compensation means 33.

FIG. 11 finally shows a further exemplary embodiment of the arrangement of the traction means 17a and 17b for forming the winding devices 30. The winding devices 30 are formed as double-embodied, eight-fold acting pulleys 30 and in the manner which has already been described, the traction means 17a and 17b are wrapped around the drive wheels 34 and 35, which are formed by means of respective partial wheels 34a, 34b, 35a and 35b.

In the area of a compensation roller 47, the traction means 17a and 17b are connected to one another such that the traction means 17a and 17b merge into one another and form a sole, yet double-guided traction means 17 comprising a double length. A length compensation is also attained by means of the compensation roller 47, so that the traction means 17 encompasses the same tractive force, both in the length area of the traction means 17a as well as in the length area of the traction means 17b. The traction means ends 48 of the traction means 17 are accommodated in mounting points, which can also be embodied so as to be movable in height, wherein, according to this exemplary embodiment, the compensation roller 47 can also be accommodated so as to be movable in height.

Figure 12:
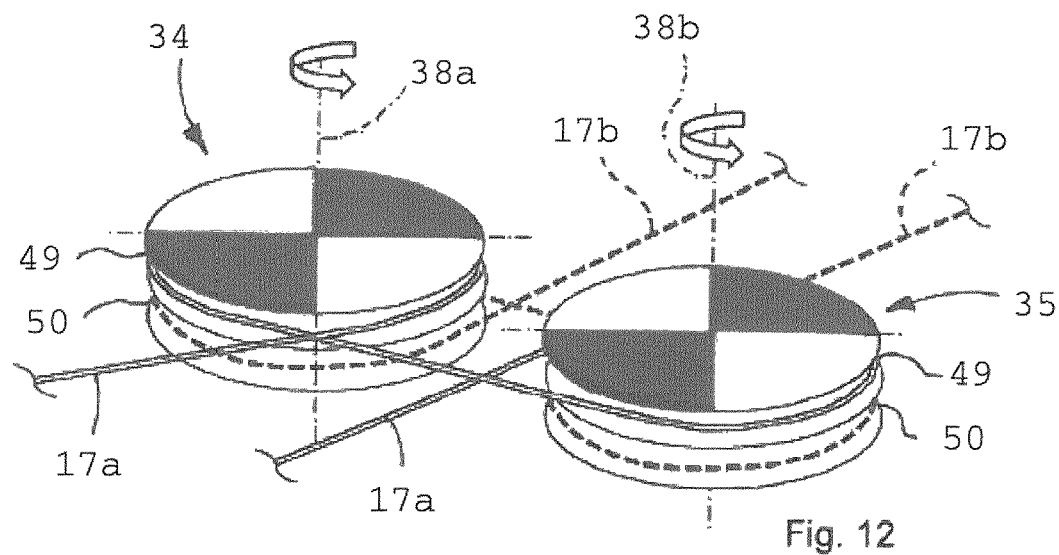
FIG. 12 is a partial isometric schematic view of an embodiment of the drive wheels of the drive unit, around which two traction means are wrapped, according to the present disclosure.
Figure 13:
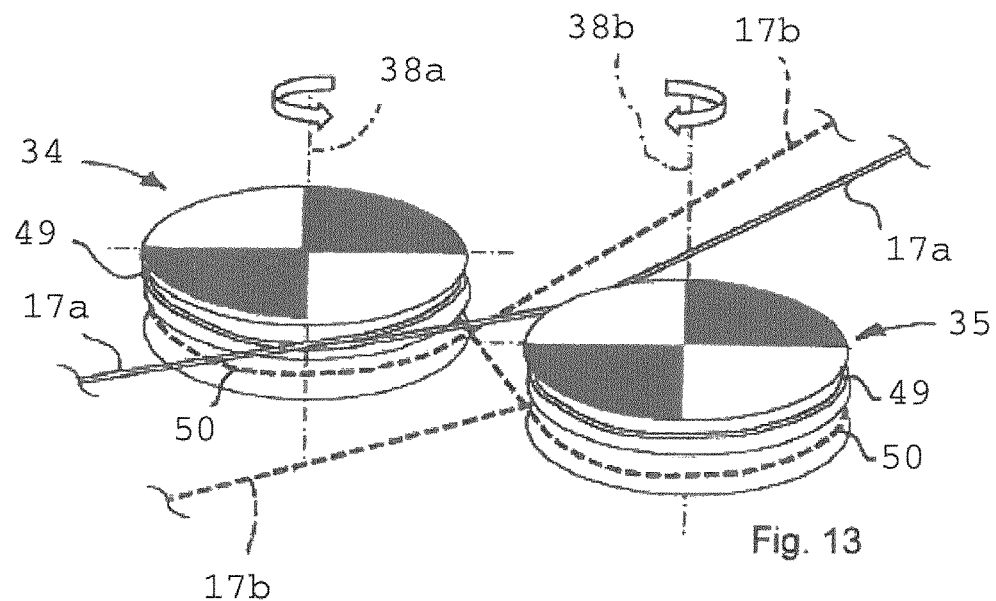
FIG. 13 is a partial isometric schematic view of an alternate embodiment of the drive wheels of the drive unit, around which two traction means are wrapped, according to the present disclosure.

FIGS. 12 and 13 in each case show a further arrangement of the drive wheels 34 and 35 of the drive unit 27, as it is illustrated in FIG. 8. Two traction means 17a and 17b wrap around the drive wheels 34 and 35 and the traction means 17a and 17b are guided in parallel in a manner, which is not shown in detail, and are connected to the conveying baskets 15 and 16, for example, so as to move them.

The drive wheels 34 and 35 in each case encompass two grooves 49 and 50, and the first traction means 17a is guided in the respective first groove 49 of the drive wheels 34 and 35, and the second traction means 17b is guided in the respective second groove 50 of the drive wheels 34 and 35. The drive wheels 34 and 35 thereby in each case rotate about their drive axles 38a and 38b.

A first alternative of the wrapping of the drive wheels 34 and 35 by the traction means 17a and 17b is shown in FIG. 12. According to the example, the traction means 17a and 17b wrap around the drive wheels 34 and 35 in each case at an angle of approximately 270°. Said angle, however, is a function of the direction, in which the ends of the traction means 17a and 17b are guided away from the drive wheels 34 and 35. The shown example thereby shows a total wrap angle of 540°. The advantage resulting from the illustrated wrappings alternative is an identical torque loading of the drive wheels 34 and 35 and an even wear of the grooves 49 and 50 results. The drive wheels 34 and 35 can furthermore rotate in the same direction of rotation about the drive axles 38a and 38b.

A further alternative of the wrappings of the drive wheels 34 and 35 by the traction means 17a and 17b is shown in FIG. 13. The traction means 17a and 17b wrap around the drive wheels 34 and 35 in each case at an angle of approximately 300°. This angle, however, is also a function herein of the direction, in which the ends of the traction means 17a and 17b are guided away from the drive wheels 34 and 35. The shown example thereby shows a total wrap angle of 600°. The drive wheels 34 and 35 can rotate in opposite direction of rotation about the drive axles 38a and 38b.

The advantage, which results in each case by means of the shown wrapping alternatives, is furthermore a reduction of the number of required grooves of the drive wheels 34 and 35, because four individual grooves are required for each of the drive wheels 34 and 35 in the alternatives shown in FIGS. 10 and 11 and only two grooves 49 and 50 are required for each of the drive wheels 34 and 35 in the alternatives shown in FIGS. 12 and 13.

The embodiment of the invention is not limited to the above-specified preferred exemplary embodiments. Instead, a number of alternatives is possible, which utilizes the specified solution even in the case of embodiments, which are completely different. Ail of the features and/or advantages resulting from the claims, the description or the drawings, including structural details or spatial arrangements, can be significant for the invention, both alone and in a variety of combinations.

The invention claimed is:

1. A steep conveying installation for transporting materials between a lower height position and an upper height position in an open-cast mining glory hole, comprising:
a material transportation line comprising at least one guide rail configured to be disposed on a slope of the open-cast mining glory hole, and on which at least one guide rail materials may be transported, said at least one guide rail having a lower end disposed at the lower height position and an upper end disposed at the upper height position;
a first conveying basket continuously disposed on said at least one guide rail of said material transportation line and configured to transport materials between the lower end of said at least one guide rail and the upper end of said at least one guide rail, along said line;
a second conveying basket continuously disposed on said at least one guide rail of said material transportation line and configured to transport materials between the lower end of said at least one guide rail and the upper end of said at least one guide rail, along said line;
a common traction means coupled to each of said first and second conveying baskets and configured to alternatingly raise one of said first and second conveying baskets along said at least one guide rail of said material transportation line, while simultaneously lowering the other of said first and second conveying baskets in an upright orientation along said at least one guide rail of said material transportation line, in a reciprocating manner, wherein said first and second conveying baskets each comprise a closeable emptying opening defined in a sidewall of each of said baskets below said filling opening of said conveying baskets, and wherein said emptying opening is configured to permit the emptying there through of hauled materials carried in said conveying baskets without the need to tilt either of said conveying baskets;
a filling device disposed at the lower end of said at least one guide rail and configured to fill each of said first and second conveying baskets with materials to be transported along said at least one guide rail of said material transportation line, when one of said first or second conveying baskets has been lowered to said lower end of said at least one guide rail, wherein said filling device comprises a filling funnel through which raw materials can be guided into a filling opening of at least one of said first and second conveying baskets, and a ramp disposed proximal to an open upper end of said filling funnel and configured to permit a material hauling vehicle to be moved to a height above said conveying baskets when said conveying baskets are positioned at said lower end of said at least one guide rail.

2. The steep conveying installation of claim 1, further comprising a material handling device disposed at the upper height position adjacent said upper end of said at least one guide rail, wherein said at least one guide rail extends above the upper height position of said line and is configured to permit
said closeable emptying opening of at least one of said conveying baskets to be selectively opened above said material handling device disposed at said upper height position adjacent said line, and
hauled material to exit said conveying baskets through said closeable emptying opening when in an opened state and enter said material handling device by the force of gravity acting on the hauled material.

3. The steep conveying installation of claim 2, wherein said material handling device is a comminution device.

4. The steep conveying installation of claim 2, further comprising:
a supporting structure coupled to each of said at least one guide rail of said material transportation line and said material handling device, and configured to structurally support a portion of said at least one guide rail that extends above the upper height position of said line.

5. The steep conveying installation of claim 1, further comprising:
a drive unit having one or more drive wheels in frictional communication with said common traction means, wherein said common traction means is guided and driven by said drive wheels.

6. The steep conveying installation of claim 1, further comprising:
one or more upper deflection rollers disposed about an upper end of said line; and
one or more lower deflection rollers disposed about each of said first and second conveying baskets,
wherein said common traction means is wrapped at least partially around and extends between said upper and lower deflection rollers so as to form a pulley system therewith.

7. The steep conveying installation of claim 1, further comprising:
a length compensation means coupled to opposing ends of said common traction means and configured to selectively retract or payout said common traction means therefrom so as to increase or decrease a working length of said common traction means in said installation.

8. A steep conveying installation for transporting materials between a lower height position and an upper height position in an open-cast mining glory hole, comprising:
a material transportation line comprising at least one guide rail configured to be disposed on a slope of the open-cast mining glory hole, and on which at least one guide rail materials may be transported, said at least one guide rail having a lower end disposed at the lower height position and an upper end disposed at the upper height position;
a first conveying basket continuously disposed on said at least one guide rail of said material transportation line and configured to transport materials between the lower end of said at least one guide rail and the upper end of said at least one guide rail, along said line;
a second conveying basket continuously disposed on said at least one guide rail of said material transportation line and configured to transport materials between the lower end of said at least one guide rail and the upper end of said at least one guide rail, along said line;
a common traction means coupled to each of said first and second conveying baskets and configured to alternatingly raise one of said first and second conveying baskets along said at least one guide rail of said material transportation line, while simultaneously lowering the other of said first and second conveying baskets in an upright orientation along said at least one guide rail of said material transportation line, in a reciprocating manner, wherein said first and second conveying baskets each comprise a closeable emptying opening defined in a sidewall of each of said baskets below said filling opening of said conveying baskets, and wherein said emptying opening is configured to permit the emptying there through of hauled materials carried in said conveying baskets without the need to tilt either of said conveying baskets;
one or more upper deflection rollers disposed about an upper end of said line; and
one or more lower deflection rollers disposed about each of said first and second conveying baskets,
wherein said common traction means is wrapped at least partially around and extends between said upper and lower deflection rollers so as to form a pulley system therewith, wherein said pulley system comprises two connected pulley systems and includes at least a first traction means and a separate second traction means, wherein together said first and second traction means form a first pulley sub-system for raising and lowering said first conveying basket about said line, wherein together said first and second traction means also form a second pulley sub-system for raising and lowering said second conveying basket about said line, and wherein said at least two traction means wrap around and are driven by a plurality of drive wheels of a drive unit.

9. The steep conveying installation of claim 8, wherein said plurality of drive wheels include at least a first drive wheel around which said first traction means is wrapped, and at least a second drive wheel around which said second traction means is wrapped, wherein said first and second drive wheels are arranged so as to rotate about a common drive axle.

10. The steep conveying installation of claim 8, wherein said plurality of drive wheels include at least a first drive wheel and a second drive wheel around both of which at least one of said first and second traction means is wrapped.

11. The steep conveying installation of claim 8 wherein the pulley system is a pulley system having at least a 2:1 mechanical advantage.

12. The steep conveying installation of claim 8 comprising a filling device disposed at the lower end of said at least one guide rail and configured to fill each of said first and second conveying baskets with materials to be transported along said at least one guide rail of said material transportation line, when one of said first or second conveying baskets has been lowered to said lower end of said at least one guide rail.

13. The steep conveying installation of claim 8 comprising a material handling device disposed at the upper height position adjacent said upper end of said at least one guide rail, wherein said at least one guide rail extends above the upper height position of said line and is configured to permit
said closeable emptying opening of at least one of said conveying baskets to be selectively opened above said material handling device disposed at said upper height position adjacent said line, and
hauled material to exit said conveying baskets through said closeable emptying opening when in an opened state and enter said material handling device by the force of gravity acting on the hauled material.

14. The steep conveying installation of claim 13 wherein said material handling device is a comminution device.

15. The steep conveying installation of claim 13 comprising a supporting structure coupled to each of said at least one guide rail of said material transportation line and said material handling device, and configured to structurally support a portion of said at least one guide rail that extends above the upper height position of said line.

16. A steep conveying installation for transporting materials between a lower height position and an upper height position in an open-cast mining glory hole, comprising:

a material transportation line comprising at least one guide rail configured to be disposed on a slope of the open-cast mining glory hole, and on which at least one guide rail materials may be transported, said at least one guide rail having a lower end disposed at the lower height position and an upper end disposed at the upper height position;

a first conveying basket continuously disposed on said at least one guide rail of said material transportation line and configured to transport materials between the lower end of said at least one guide rail and the upper end of said at least one guide rail, along said line;

a second conveying basket continuously disposed on said at least one guide rail of said material transportation line and configured to transport materials between the lower end of said at least one guide rail and the upper end of said at least one guide rail, along said line;

a common traction means coupled to each of said first and second conveying baskets and configured to alternatingly raise one of said first and second conveying baskets along said at least one guide rail of said material transportation line, while simultaneously lowering the other of said first and second conveying baskets in an upright orientation along said at least one guide rail of said material transportation line, in a reciprocating manner, wherein said first and second conveying baskets each comprise a closeable emptying opening defined in a sidewall of each of said baskets below said filling opening of said conveying baskets, and wherein said emptying opening is configured to permit the emptying there through of hauled materials carried in said conveying baskets without the need to tilt either of said conveying baskets; and a drive unit having one or more drive wheels in frictional communication with said common traction means, wherein said common traction means is guided and driven by said drive wheels, wherein said drive unit includes at least two drive wheels around which said common traction means is wrapped so as to have a total wrap angle of at least 360-degrees, wherein said drive unit includes a first motor transmission unit configured to drive at least a first drive wheel, and a second motor transmission unit configured to drive at least a second drive wheel.

17. The steep conveying installation of claim 16 comprising a material handling device disposed at the upper height position adjacent said upper end of said at least one guide rail, wherein said at least one guide rail extends above the upper height position of said line and is configured to permit
said closeable emptying opening of at least one of said conveying baskets to be selectively opened above said material handling device disposed at said upper height position adjacent said line, and
hauled material to exit said conveying baskets through said closeable emptying opening when in an opened state and enter said material handling device by the force of gravity acting on the hauled material.

18. The steep conveying installation of claim 17 wherein the material handling device is a comminution device.

19. The steep conveying installation of claim 16 comprising a length compensation means coupled to opposing ends of said common traction means and configured to selectively retract or payout said common traction means therefrom so as to increase or decrease a working length of said common traction means in said installation.

20. The steep conveying installation of claim 16 comprising
one or more upper deflection rollers disposed about an upper end of said line; and
one or more lower deflection rollers disposed about each of said first and second conveying baskets,
wherein said common traction means is wrapped at least partially around and extends between said upper and lower deflection rollers so as to form a pulley system therewith.

* * * * *